Patented Jan. 15, 1929.

1,699,374

UNITED STATES PATENT OFFICE.

WILLIAM L. PALMER, OF LONG BEACH, CALIFORNIA.

PROCESS OF AND MIXTURE FOR CLEANING CRUDE OIL.

No Drawing. Application filed May 17, 1926. Serial No. 109,788.

This invention relates to a process of cleaning crude oil or, in other words, to a process for separating the oil from the water and other foreign matter associated with said oil as it comes from the wells. The invention also relates to the mixture for effecting the cleaning.

It is well known that crude oil has mixed with it more or less water and that the oil and water is often in an emulsified condition, thus making the seperation thereof rather difficult.

It is an object of this invention to facilitate the separation of the oil from water and whatever other foreign matter, such as sand, may be mixed with the oil.

A further object is to accomplish the foregoing by mixing with the mixture of oil and water a number of chemicals which will hasten the separation, so that the treated oil need only stand in the gravity separating tanks from twelve to twenty-four hours.

The mixture which I at present employ for treating the oil includes:

| | Parts. |
|---|---|
| Oxalic acid, approximately | .01 |
| Glycerin, honey, or castor oil, approximately | .01 |
| Glacial-acetic acid, approximately | .02 |
| Cresylic acid, approximately | .48 |
| Oleic acid, approximately | .48 |

The oxalic acid is dissolved in the glycerin, honey or castor oil and the dissolving is facilitated by heating the mixture to a temperature somewhat below the boiling point. After the oxalic acid is dissolved, the mixture thus made is mixed with the other ingredients by pouring them together to form the cleaning mixture.

The cleaning mixture is then added to the oil in approximately the proportion of one gallon of the mixture to one hundred barrels of crude oil. Mixing with the oil may be accomplished by circulating the mixture and oil from bottom to top of a suitable tank or, if desired, the mixture may be added drop by drop on its way through the pipe line from the wells to the tank by employing in said pipe line a sight feed lubricator.

After the ingredients and oil have been thoroughly mixed, the treated oil is allowed to stand in the tank from twelve to twenty four hours, the length of time depending upon the character of the oil and the amount of foreign matter that it carries. This standing of the oil in the tank is for the purpose of permitting the water and other foreign matter to be precipitated by the action of gravity so that the clean oil will remain in the upper portion of the tank and can be drawn off from time to time.

The amounts of the different ingredients given above have been determined by extensive experimentation and, though the amounts may be varied to some extent, relatively great variations from the amounts given will not produce the desired results. I have not found any substance beside glycerin, honey or castor oil that will function as a solvent for oxalic acid, but in the appended claims I employ the expression "solvent" for oxalic acid instead of the terms glycerin, honey or castor oil, in order to be sure to include any other substances that I may discover in the future to be solvents for the oxalic acid, since the only function of the glycerin, honey or castor oil in the mixture is to reduce the oxalic acid crystals to a liquid condition in order that said acid may be properly mixed with the oil and water.

I claim:—

1. The process of cleaning crude oil which consists in dissolving oxalic acid in a suitable solvent, mixing with the acid thus dissolved glacial-acetic acid, cresylic acid and oleic acid, adding the mixture thus produced to the crude oil, and then permitting the oil to stand until the water settles out.

2. A cleaning mixture for crude oil comprising oxalic acid in solution, glacial-acetic acid, cresylic acid and oleic acid.

3. A cleaning mixture for crude oil comprising approximately one part oxalic acid dissolved in approximately one part glycerin, approximately two parts glacial-acetic acid, approximately 48 parts cresylic acid, and approximately 48 parts oleic acid.

4. A cleaning mixture for crude oil, comprising, approximately one part oxalic acid dissolved in approximately one part solvent, approximately two parts glacial-acetic acid, approximately 48 parts cresylic acid and approximately 48 parts oleic acid.

Signed at Los Angeles, Calif., this 29 day of March, 1926.

WILLIAM L. PALMER.